United States Patent
Lackner et al.

(10) Patent No.: US 9,984,551 B2
(45) Date of Patent: May 29, 2018

(54) SYSTEM AND METHOD FOR ANTICIPATING LOW-SPEED BEARING FAILURE

(71) Applicant: Ashworth Bros., Inc., Fall River, MA (US)

(72) Inventors: Joseph M. Lackner, Medina, MN (US); Arthur J. Marshall, Gettysburg, PA (US)

(73) Assignee: Ashworth Bros., Inc., Fall River, MA (US)

( * ) Notice: Subject to any disclaimer, the term of this patent is extended or adjusted under 35 U.S.C. 154(b) by 0 days. days.

(21) Appl. No.: 15/070,826

(22) Filed: Mar. 15, 2016

(65) Prior Publication Data

US 2017/0270770 A1   Sep. 21, 2017

(51) Int. Cl.
*G08B 21/18* (2006.01)
*B65G 21/18* (2006.01)
(Continued)

(52) U.S. Cl.
CPC .......... *G08B 21/187* (2013.01); *B65G 21/18* (2013.01); *B65G 43/00* (2013.01); *F16C 19/52* (2013.01);
(Continued)

(58) Field of Classification Search
USPC ........................................ 340/429, 679, 683
See application file for complete search history.

(56) References Cited

U.S. PATENT DOCUMENTS

| | | | | |
|---|---|---|---|---|
| 3,745,815 A | * | 7/1973 | Bentone | G01M 13/045 |
| | | | | 73/593 |
| 4,248,324 A | * | 2/1981 | Mifsud | G01V 1/145 |
| | | | | 181/121 |

(Continued)

FOREIGN PATENT DOCUMENTS

| | | |
|---|---|---|
| EP | 2131177 A1 | 12/2009 |
| EP | 3220122 A1 | 9/2017 |

(Continued)

OTHER PUBLICATIONS

Extended European Search Report dated Jul. 13, 2017 for European Patent Application No. 17161035.5.

(Continued)

*Primary Examiner* — Fekadeselassie Girma
(74) *Attorney, Agent, or Firm* — Plumsea Law Group, LLC

(57) ABSTRACT

A system for anticipating low-speed bearing failure triggers a notification when a noise generated by the low-speed bearing exceeds a threshold. The system predicts failure far in advance of the actual failure. The system includes an accelerometer for detecting the noise generated by the bearing. The signal produced by the accelerometer is processed using a band pass filter, an amplifier/rectifier, an averaging filter, and a voltage to current converter. The signal and raw data are transmitted to a remote monitoring system, such as a computer. The signal is further analyzed, such as to produce a best-fit line. When the signal exceeds a predetermined threshold, such as when the amount or the slope of the best-fit line exceeds a value, the remote system notifies a monitor to schedule maintenance.

42 Claims, 11 Drawing Sheets

(51) Int. Cl.
  B65G 43/00 (2006.01)
  G01M 13/04 (2006.01)
  F16C 19/52 (2006.01)
(52) U.S. Cl.
  CPC ......... G01M 13/045 (2013.01); G08B 21/182 (2013.01)

(56) References Cited

U.S. PATENT DOCUMENTS

| | | | |
|---|---|---|---|
| 4,493,042 A | 1/1985 | Shima et al. | |
| 4,563,897 A * | 1/1986 | Moore | G01N 3/58 700/175 |
| 4,884,449 A | 12/1989 | Nishimoto et al. | |
| 5,423,218 A * | 6/1995 | Matsuzaki | G01M 13/045 73/593 |
| 5,646,350 A | 7/1997 | Robinson et al. | |
| 6,053,047 A | 4/2000 | Dister et al. | |
| 6,138,516 A * | 10/2000 | Tillman | G01H 1/16 340/429 |
| 6,279,731 B1 * | 8/2001 | Anderson | B65G 27/12 198/763 |
| 6,324,490 B1 * | 11/2001 | Johansson | D21G 9/0009 700/108 |
| 7,025,196 B2 * | 4/2006 | Pfarr | B23K 26/0838 198/813 |
| 8,065,916 B2 | 11/2011 | Yanohara et al. | |
| 8,534,128 B2 | 9/2013 | Murayama | |
| 2005/0077152 A1 * | 4/2005 | Pfarr | B23K 26/0838 198/813 |
| 2007/0208841 A1 * | 9/2007 | Barone | B61L 15/0027 709/223 |
| 2010/0019084 A1 * | 1/2010 | Sisk | B64F 5/00 244/1 R |
| 2010/0256927 A1 * | 10/2010 | Hala | F04B 49/225 702/33 |
| 2013/0096848 A1 | 4/2013 | Hatch et al. | |
| 2014/0132418 A1 * | 5/2014 | Lill | G05B 19/0428 340/679 |
| 2015/0307701 A1 * | 10/2015 | Croisier | C08L 89/00 524/528 |
| 2016/0062820 A1 * | 3/2016 | Jones | G06K 9/6265 714/37 |
| 2017/0052062 A1 * | 2/2017 | Jia | G01P 3/00 |

FOREIGN PATENT DOCUMENTS

| | | |
|---|---|---|
| JP | S59173720 A | 10/1984 |
| JP | 07243944 A | 9/1995 |
| JP | 08210347 A | 8/1996 |
| JP | 2007178347 A | 7/2007 |
| WO | 2015/002617 A1 | 1/2015 |

OTHER PUBLICATIONS

Chris James et al: "Slow Speed Vibration Monitoring", published Mar. 31, 2015; retrieved from the internet: http://www.sirfrt.com.au/library/file/2949/4282.

Communication pursuant to Rule 69 EPC and invitation pursuant to Rule 70a(a) EPC dated Sep. 25, 2017 for European Patent Application No. 17161035.5.

* cited by examiner

SYSTEM AND METHOD FOR ANTICIPATING LOW-SPEED BEARING FAILURE

BACKGROUND OF THE INVENTION

The present invention relates to systems for the remote monitoring of a bearing. In particular, the invention relates to a system for remotely monitoring a low-speed bearing with sufficient time before failure to incorporate maintenance of the bearing into regularly scheduled maintenance.

SUMMARY OF THE INVENTION

A system and method for advance detection and warning of anticipated failure of a low-speed bearing system includes a two-part detection system. A first part of the bearing failure detection system is disposed on or proximate the bearing. A second part of the bearing failure detection system is located at a remote location from the bearing. The system and method are calibrated to detect a degrading condition of bearings in use in a low-speed or low-RPM (revolutions per minute) system and to anticipate when the degradation of the bearing is likely to cause a failure. The system anticipates the likely failure with sufficient lead time to allow for bearing replacement to occur with routine maintenance instead of an emergency or unscheduled shut down. In some embodiments, the system may anticipate failure of the bearing six months to a year prior to a catastrophic failure of the bearing.

To anticipate the failure of the bearing, raw noise data is acquired, processed, and then averaged. The average is compared to a pre-determined threshold to indicate to a technician or automated system that maintenance is due. The low-speed bearing failure detection system includes a portion attached to the bearing and a remote system. The remote system monitors the sounds generated by the bearings and allows for a technician to schedule the maintenance of the system when indicated.

In one aspect, the invention provides a system for advance detection of bearing failure for a bearing rotating at a low RPM, the bearing being incorporated in a conveyor mechanism, and the bearing having an outer portion, an inner portion, and an intermediate portion separating the outer portion from the inner portion. The system includes an accelerometer portion positioned on a housing of the bearing, wherein the accelerometer is configured to detect a vibration of the bearing. A low-pass filter portion is configured to pass frequency components of an electrical signal less than a low-passing frequency and configured to reject frequency components of the electrical signal greater than the low-passing frequency. An AC-to-DC conversion portion is configured to convert an alternating-current electrical signal to a direct-current electrical signal containing information regarding a condition of the bearing. A transmitter is associated with the AC-DC conversion portion. A remote monitoring device is provided, wherein the remote monitoring device is configured to receive from the transmitter the information regarding the condition of the bearing. A warning device associated with the remote monitoring device, wherein the warning device is configured to indicate when the information received by the remote monitoring device exceeds a predetermined threshold.

In another aspect, the invention provides a component of a system for advance detection of bearing failure for a bearing rotating between approximately 0.1 RPM and approximately 10.0 RPM, the bearing being incorporated in a conveyor mechanism, and the bearing having an outer portion, an inner portion, and an intermediate portion separating the outer portion from the inner portion. The component includes an accelerometer portion configured to detect frequencies between approximately 0.5 Hz and approximately 15,000 Hz. The component includes a frequency filtering portion that is configured to pass frequency components of an electrical signal less than approximately 500 Hz and configured to reject frequency components of the electrical signal greater than approximately 500 Hz. The component also includes an AC-to-DC conversion portion configured to rectify an alternating-current electrical signal to a direct-current electrical signal. The component is configured to process an output of the accelerometer through both the frequency filtering portion and the AC-to-DC conversion portion, and wherein the component is configured to transmit an electrical signal derived from the direct-current electrical signal.

In another aspect, the invention provides a method for advance detection of bearing failure for a bearing rotating between approximately 0.1 RPM and approximately 10.0 RPM, the bearing being incorporated in a conveyor mechanism, and the bearing having an outer portion, an inner portion, and an intermediate portion separating the outer portion from the inner portion. The method includes step of positioning an accelerometer to detect a vibration of the bearing, the accelerometer being configured to detect frequencies between approximately 0.5 Hz and approximately 15,000 Hz, and the accelerometer having an output. The method also includes the step of filtering the output of the accelerometer through a low-pass filter configured to reject frequencies greater than 500 Hz. The method also includes the step of rectifying the output of the accelerometer through an AC-to-DC converter configured to convert an alternating-current electrical signal to a direct-current electrical signal. The method also includes the step of transmitting the output of the accelerometer to a remote monitoring device.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

A system and method for advance detection and warning of anticipated failure of a low-speed bearing system includes a two-part detection system. A first part of the bearing failure detection system is disposed on or proximate the bearing. A second part of the bearing failure detection system is located at a remote location from the bearing. The system and method are calibrated to detect a degrading condition of bearings in use in a low-speed or low-RPM (revolutions per minute) system and to anticipate when the degradation of the bearing is likely to cause a failure. The system anticipates the likely failure with sufficient lead time to allow for bearing replacement to occur with routine maintenance instead of an emergency or unscheduled shut down. In some embodiments, the system may anticipate failure of the bearing six months to a year prior to a catastrophic failure of the bearing.

To anticipate the failure of the bearing, raw noise data is acquired, processed, and then averaged. The average is compared to a pre-determined threshold to indicate to a technician or automated system that maintenance is due. The low-speed bearing failure detection system includes a portion attached to the bearing and a remote system. The remote system monitors the sounds generated by the bearings and allows for a technician to schedule the maintenance of the system when indicated. The indication occurs well before bearing failure would cause a shut-down of the system, for example six months to a year before anticipated bearing failure.

Figure 1:
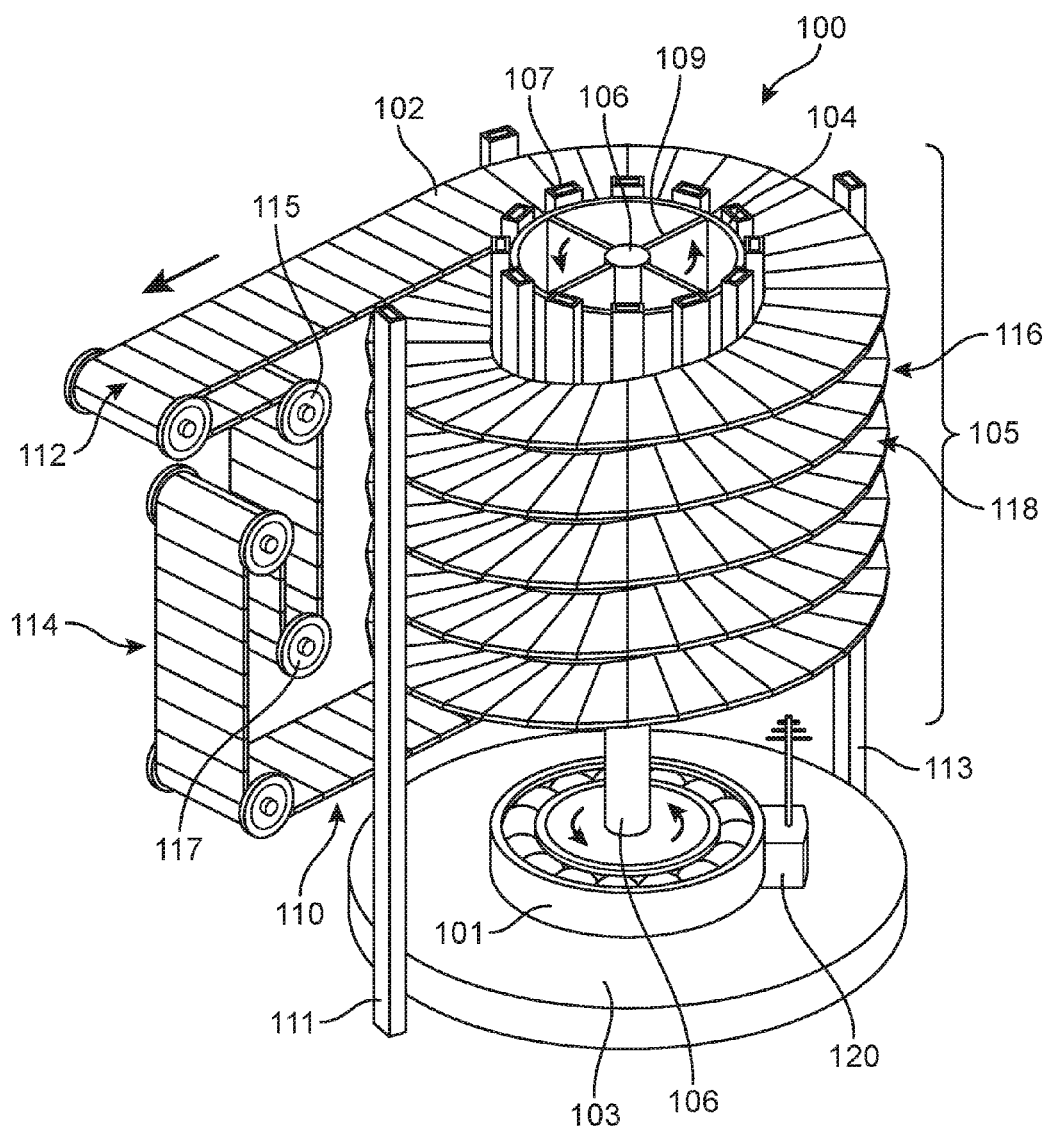
FIG. 1 is a perspective view of a spiral conveyor system.

FIG. 1 shows an embodiment of a spiral conveyor system 100 that may utilize at least one bearing in a low-speed drive system. Spiral conveyor systems such as spiral conveyor system 100 are well known in the art. Spiral conveyor system 100 may include a conveyor belt 102 that is configured to travel a spiral column 105 around a driving drum 104. In some embodiments, driving drum 104 may include one or more drive bar 107 that engages with a side of conveyor belt 102 for a direct drive system. Such drive systems are well-known in the art. In other embodiments, driving drum 104 and the edge of conveyor belt 102 may include provisions that engage with each other to transfer driving force from the turning drum to the conveyor belt.

Conveyor belt 102 may be any type of endless belt known in the art. Conveyor belt 102 may be made from metal, plastic, composites, ceramics, combinations of these materials, or any other type of conveyor belt material known in the art. In some embodiments, such as the embodiment shown in FIG. 1, belt 102 may travel from a bottom 110 of spiral column 105 to a top 112 of spiral column 105. In other embodiments, the direction of travel may be reversed.

As an endless belt, belt 102 returns from an exit of the spiral path at top 112 back to an entrance to spiral column 105 at bottom 110. To enable this return along return path 114, system 100 may include a take-up reel such as take-up reel 115. Take-up reel 115 may be indirectly driven by the tension in belt 102 or take-up reel 115 may be independently driven, such as with a motor (not shown). In some embodiments, the motor may be a constant torque motor so that the tension in belt 102 may be maintained within a desired range. In some embodiments, a weighted reel 117 may be provided to assist in maintaining the belt tension along return path 114.

Drum 104 is configured to turn at low RPM (revolutions per minute). The precise speed may depend upon factors such as the height of spiral column 105, the length of belt 102, and the intended use of the system, such as to establish a particular cooking, baking, or freezing time. In some embodiments, drum 104 may turn at 15 RPM or less. In some embodiments, drum 104 may turn at 10 RPM or less. In some embodiments, drum 104 may turn at 4 RPM or less. In some embodiments, drum 104 may turn at a rate between 0.1 RPM and 10 RPM, inclusive.

Drum 104 may be driven using any method known in the art, such as with a motor (not shown) positioned proximate a base 103 of spiral conveyor system 100. The motor may transfer the power it generates to the drum 104 using any mechanism known in the art. In some embodiments, such as the embodiment shown in FIG. 1, known systems, such as chains and gear boxes to control the transfer of power from the motor to shaft 106, may be provided. Shaft 106 may be any type of drive shaft known in art, such as an elongated metal pole that extends from base 103 to the top of spiral column 105. One or more struts such as strut 109 may attach shaft 106 to drum 104 to transfer the rotational force of shaft 106 to drum 104.

Figure 2:
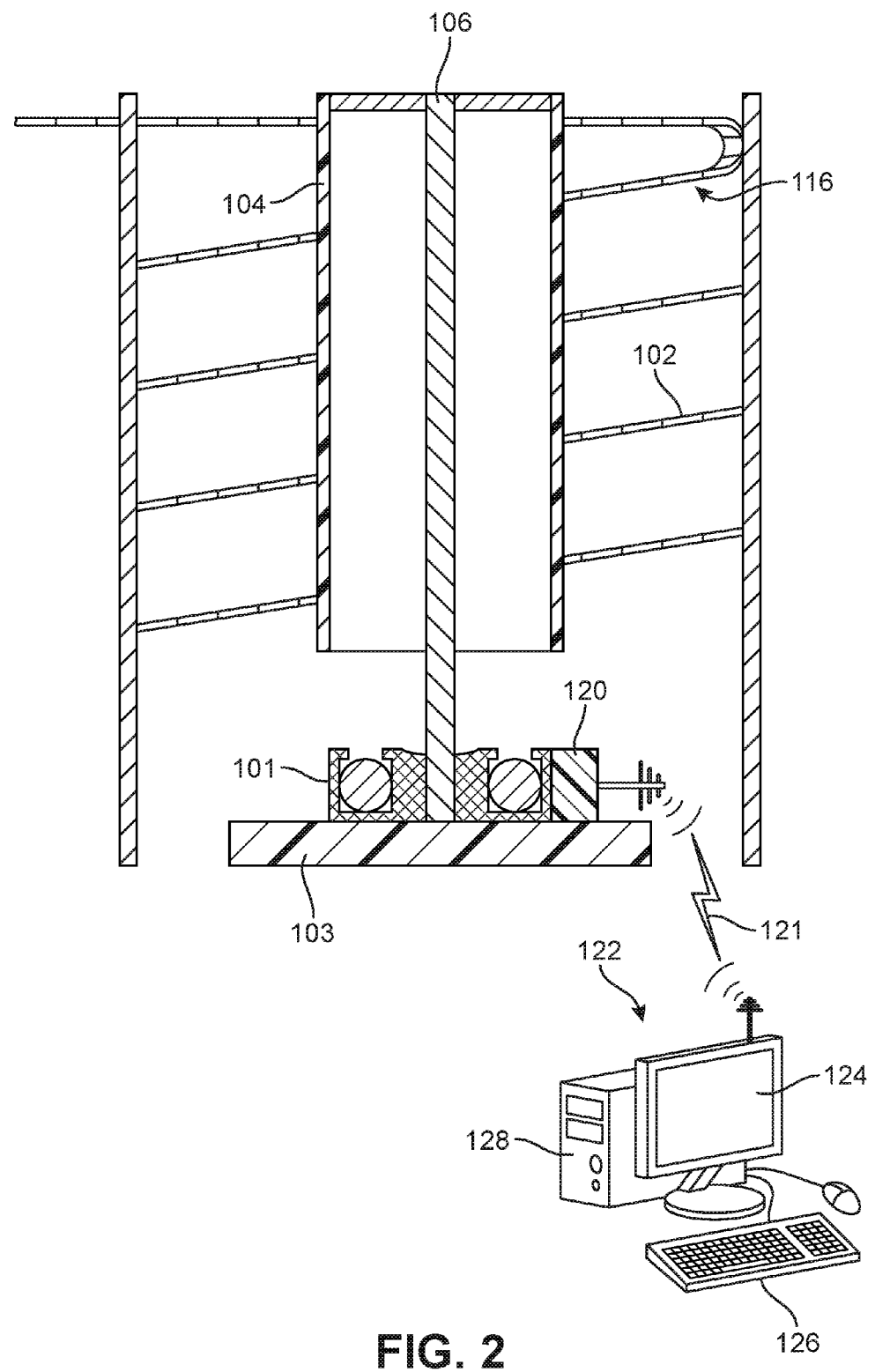
FIG. 2 is a cross-sectional view of a spiral conveyor system with a bottom bearing and a system for detecting bearing failure.
Figure 3:
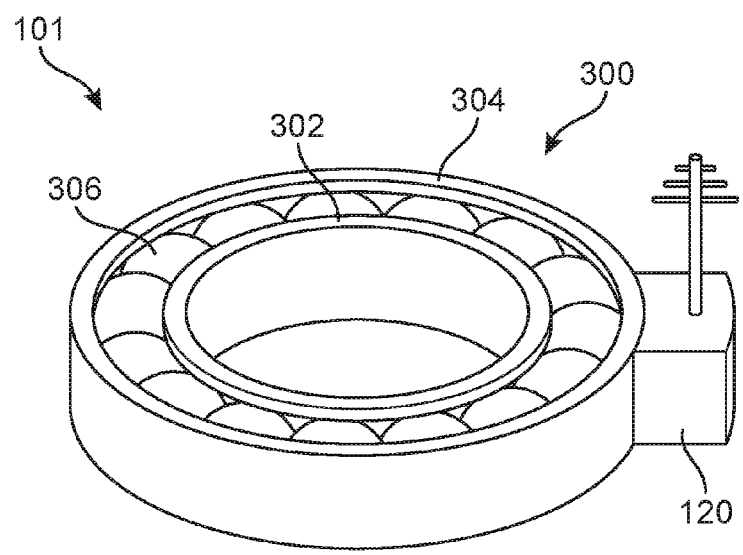
FIG. 3 is a perspective view of a bearing with a portion of a system for detecting bearing failure attached to the housing of the bearing.

A bottom bearing 101 may be provided in, on, or associated with a motor, gearbox, and/or a conveyor frame. As is known in the art, a bottom bearing 101 is provided to reduce rotational friction between the motor and/or base 103 and shaft 106 while supporting radial and axial loads. Bearings and their functionality are generally well known and understood in the art. In some embodiments, such as the embodiment shown in the figures, bottom bearing 101 may be a rolling element, as shown in FIGS. 1-3. Though only a bottom bearing is shown, system 100 may be provided with any number of bearings desired for a smooth running of the system. As shown in FIG. 3, bottom bearing 101 includes a bearing housing 300 and one or more rolling elements 306. While shown as spherical ball bearings, rolling elements 306 may be any type of rolling element known in the art. For example, in some embodiments with high axial thrust, rolling elements 306 may be cylindrical or frustoconical in shape. Housing 300 includes an inner race 302 and an outer race 304 separated by an intermediate portion. Inner race 302 and outer race 304 define the intermediate portion and are configured to contain and guide rolling elements 306 and any lubricant provided to further reduce the friction between the rolling elements as the motor turns shaft 106. Inner race 302 and outer race 304 may include grooves or tracks (not shown) to guide the motion of the rolling elements 306. Inner race 302 and outer race 304 may be made of metal, though inner race 302 and outer race 304 may be made from any material known in the art appropriate for bearing housings.

Similarly, rolling elements 306 may be made from metal, such as stainless steel, though rolling elements 306 may be made from any material known in the art appropriate for use as a rolling element. The size and number of rolling elements 306 may vary depending upon the size of shaft 106.

While generally spherical, cylindrical or frustoconical in shape, even new rolling elements 306 may have rough portions and other surface imperfections due to manufacturing capabilities. Over time, these imperfections will increase due to wear from contact with adjacent bearings as the bearings rub against and/or impact adjacent bearings. Additionally, the lubricant in the bearing may degrade from heat, use, and/or age. If these maintenance issues are not addressed, the life of the bearing may be greatly reduced. In some cases, the failure of a bearing such as bottom bearing 101 may be unexpected and catastrophic, leading to unplanned downtime for system 100 and, subsequently, time and economic losses due to production line shutdown. Therefore, spiral conveyor system 100 is provided with a system for anticipating the failure of a bearing such as bottom bearing 101.

The monitoring system includes two portions: a local portion 120 and a remote monitoring system 122. Local portion 120 is a sensor package equipped with provisions for collecting noise data, optionally processing the noise data, and transmitting the noise data to remote monitoring system 122. Remote monitoring system 122 is a computer or other system capable of receiving noise data from local portion 120, optionally processing the noise data, analyzing the noise data, and signaling when a threshold noise level is breached so that a technician or other monitor may be advised that the bearing is nearing failure and to schedule maintenance.

Local portion 120 is positioned on or near bottom bearing 101. In some embodiments, local portion 120 may be attached directly to bearing housing 300 to inhibit local portion 120 from detecting external sounds and vibrations. Attached portion 120 may be attached to bottom bearing 101 using any method known in the art, such as mechanical connectors like rivets, screws, or latches, magnetic connectors, and/or adhesives. In some embodiments, local portion 120 is attached to an outer surface of bearing housing 300 so that the housing itself does not interfere with wireless communications. In other embodiments, such as with wired communications or where remote monitoring system 122 is in close proximity to local portion 120, or where an intermediate relay is used to boost the wireless communications signal, local portion 120 may be positioned within bearing housing 300. In other embodiments, local portion 120 may be attached to system 100 proximate bearing housing 300, depending upon the sensitivity of the components of local portion 120.

Figure 4:
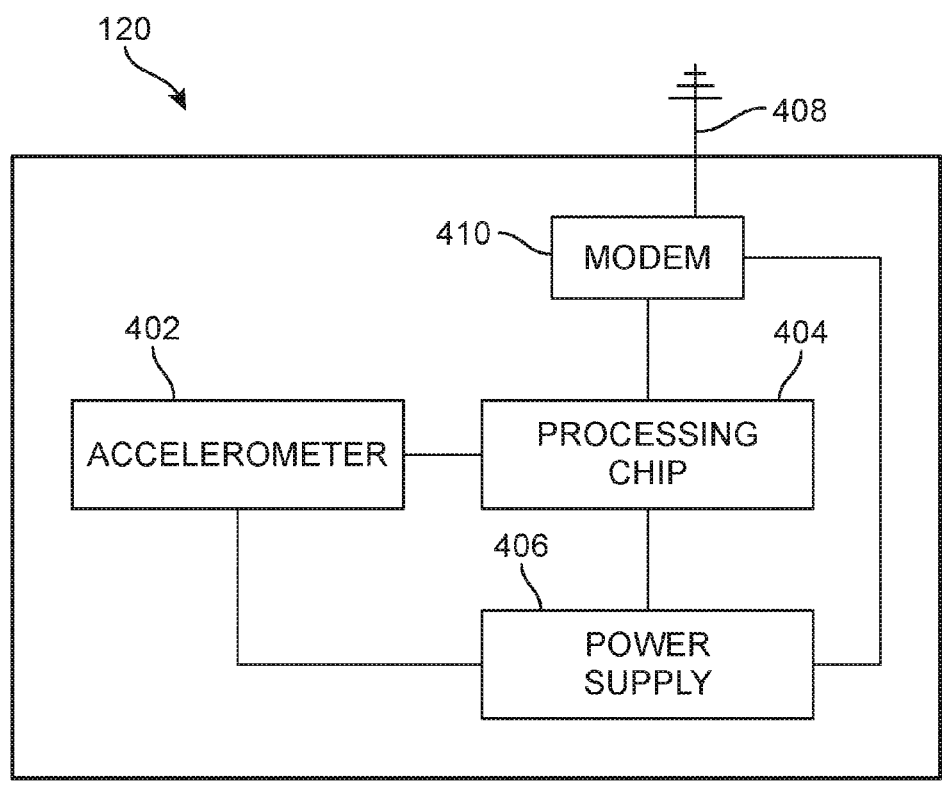
FIG. 4 is a schematic view of a portion of a system for detecting bearing failure.

FIG. 4 shows a schematic embodiment of local portion 120. The selection of the exact components may depend upon factors such as the type of spiral conveyor system 100, the type of bearing 101, and the environmental conditions surrounding the system. For example, some spiral conveyor systems are used in baking, so the environmental conditions may include a high temperature and low humidity. Other spiral conveyor systems are used for freezing food, so the environmental conditions may include low temperatures. In some embodiments, spiral conveyor systems may be used for non-food purposes, where ambient heat and humidity may be relatively uncontrolled.

As shown in FIG. 4, local portion 120 includes a sensor for collecting noise data, such as an accelerometer 402. Accelerometer 402 may be any type of accelerometer known in the art capable of detecting low level sounds, vibrations, and low frequencies. In some embodiments, accelerometer 402 is a piezoelectric In some embodiments, such as systems turning at 10 RPM or less, accelerometer 402 is configured to detect frequencies in the range of 0.5 Hz to 15 kHz. In other embodiments, accelerometer 402 may detect higher or lower frequencies depending upon the type of system to be monitored. In some embodiments, such as systems turning at 10 RPM or less, the sensitivity of accelerometer 402 is 100 mV/g. In other embodiments, accelerometer 402 may be more or less sensitive, depending upon the type and configuration of bearing to be monitored. In some embodiments, such as systems turning at 10 RPM or less, accelerometer 402 has a bias voltage of 12 V to 24 V. In other embodiments, accelerometer 402 may have a lower or higher bias voltage, depending upon the type of system to be monitored. In some embodiments, such as systems turning at 10 RPM or less, accelerometer 402 may have an excitation value of 2 mA. In other embodiments, accelerometer 402 may have a higher or lower excitation value.

In some embodiments, due to slow rotation of the bearing, vibrations may be nearly unnoticeable until the bearing is near imminent failure. However, the bearing will generate noise or sounds even if the bearing housing is not detectably vibrating. Sound is, itself, a type of vibration. A good bearing will emit noise at a low level, while a worn bearing will emit noise at a much higher level. Therefore, in some embodiments, accelerometer 402 is sufficiently sensitive to detect the noise/sound vibrations emitted by even a new bearing. By listening to the bearing, accelerometer 402 detects information from the bearing to notify a monitor of an anticipated but not imminent failure.

Accelerometer 402 feeds the noise data to a processing chip 404. In some embodiments, processing chip 404 is a component of local portion 120. In some embodiments, accelerometer 402 may be integrated into processing chip 404. In other embodiments, processing chip 404 is a component of remote system 122. Processing chip 404 is configured to filter non-bearing noise from the accelerometer data and produce an averaged signal from the raw bearing noise data collected by accelerometer 402. Processing chip 404 may include several components that are electrically connected, such as an integrated circuit chip.

Processing chip 404 includes a band pass filter 415. Band pass filter 415 is configured to filter both high frequencies and low frequencies so that only a particular range of frequencies generated by the bearing are processed further. In some embodiments, the frequencies of interest are below 500 Hz. A high pass filter portion 412, therefore, may be selected to filter any frequencies greater than 500 Hz. In some embodiments, extremely low frequencies may not contribute to the noise of bearing. Therefore, in some embodiments, a low pass filter portion 414 may be selected to filter frequencies lower than about 5 Hz. Band pass filter 415 may be tuned in some embodiments only to allow frequencies between 5 Hz and 500 Hz to proceed to an amplifier. In other embodiments, such as with systems that turn at slightly higher RPM or have different types of rolling elements, may have band pass filters that filter different frequencies.

The frequency-filtered signal then passes to an amplifier 416. Amplifier 416 increases the amplitude of the frequencies within the band of frequencies allowed by the band pass filter. The signal may be amplified to increase the power of the signal to prepare the selected frequencies for further processing. Amplifier 416 may boost the signal to a predetermined gain. In some embodiments, the gain of the signal may be 30× to 300×. In some embodiments, amplifier 416 may output the sum of the frequencies that pass through band pass filter 415. In some embodiments, the output of amplifier 416 will be a summation of frequencies below 500 Hz.

In some embodiments, amplifier 416 may also rectify the signal. Accelerometer 402 may produce an AC (alternating current) signal, while DC (direct current) may be more desirable for further signal processing. Amplifier 416 may convert the AC signal to a DC signal to smooth the sound profile, though clicking in the signal may remain due to the discontinuous nature of the noise.

The amplified and rectified signal then passes to an averaging filter portion 418. In some embodiments, averaging filter 418 may be an integrator circuit. Averaging filter 418 is configured to smooth the electrical signal. In some embodiments, the noise generated by the bearing may include sporadic frequencies as the grinding and bumping of the rolling elements against each other to produce the sound waves would not necessarily be constant. The sporadic nature of the noise is discussed further below with respect to FIG. 9. Averaging filter 418 smooths the electrical signal received from amplifier 416 by averaging the electrical signal over a time period of at least one second. In some embodiments, averaging filter 418 has a time constant between one and two seconds. In other embodiments, the time period may be less than one second or greater than two seconds. Averaging filter 418 produces a representative DC value of the noise emitted from the bearing.

The output of averaging filter 418 is then provided to a voltage-to-current (V to I) converter 420. V to I converter 420 is configured to convert a voltage-carried electrical signal to a current-carried electrical signal. In some embodiments, V to I converter 420 is configured to convert a voltage-carried electrical signal to a 1-to-20 mA current-carried electrical signal. In some embodiments, V to I converter 420 is configured to convert a voltage-carried electrical signal to a 1-to-10 mA current-carried electrical signal. In some embodiments, V to I converter 420 is configured to convert a voltage-carried electrical signal to a 4-to-20 mA current-carried electrical signal.

Figure 5:
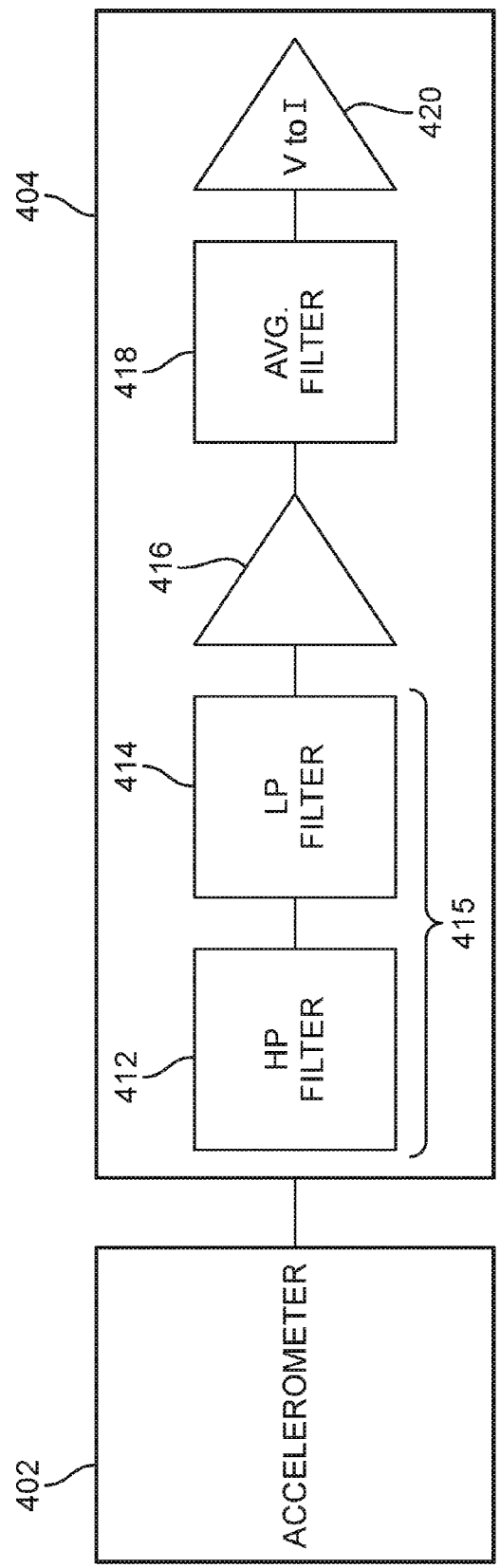
FIG. 5 is a schematic view of components of a processing for use in a system for detecting bearing failure.

The averaged signal and/or the raw noise data are transmitted to remote system 122. In some embodiments, processing chip 404 is provided with a modem 410, which may be any type of modem known in the art. In some embodiments, modem 410 may be configured to modulate the signal for wireless operation, such as WiFi. In wireless embodiments, such as the embodiment shown in FIG. 5, an antenna 408 is provided to transmit the signal to remote monitoring system 122. In some embodiments, modem 410 may be configured to modulate the signal for wireline operation, such as Ethernet. In some embodiments, modem 410 may be configured for either wireless or wireline operation.

In some embodiments, some components of local portion 120 may be directly attached to bottom bearing 101, such as on a ring, race, or housing of bottom bearing 101, while other components of local portion 120 may be disposed in close proximity but not necessarily attached to bottom bearing 101 or even system 100. In some embodiments, one or more components of local portion 120 may be positioned on a separate component or part that houses bottom bearing 100. In some embodiments, any component or group of components of local portion 120 except for accelerometer 402 may be separated by some distance from bottom bearing 101. In some embodiments, the processing chip 404, power supply 406, antenna/transmitter 408, modem 410, may be positioned at a distance from bottom bearing 101, for example, mounted on a nearby wall or station. In such embodiments, the separated components are attached to the components mounted on bottom bearing 101 using electrical signals, such as through wires or wireless connections (using multiple transmitters/receivers).

The signal output from local portion 120 may be transmitted to remote monitoring system 122 using a network 121. In some embodiments, network 121 may be an intranet. In some embodiments, network 121 may be the Internet. In some embodiments, network 121 may be a wireless or wireline telecommunications network. In some embodiments, combinations of these types of networks may be used to communicate the signal from local portion 120 to remote monitoring system 122. The type of network may be selected based upon the location of remote monitoring system 122 with respect to local portion 120. In some embodiments, remote monitoring system 122 may be in the same room, building, or campus as local portion 120. In some embodiments, remote monitoring system 122 may be positioned in a first facility and local portion 120 may be positioned in another facility. In some embodiments, a first company may control access to the first facility containing remote monitoring system 122 while a second company may control access to the second facility containing local portion 120. Given the ability of local portion 120 and remote monitoring system 122 to utilize telecommunications networks, local portion 120 and remote monitoring system 122 may be positioned anywhere in the world relative to each other.

Remote monitoring system 122 is a system that includes components that are configured to receive the transmitted signal from local portion 120, further analyze the transmitted signal, display the signal and processed data, and, eventually, to trigger an alarm or other notification to a monitor to schedule maintenance or replacement of the bearing. In some embodiments such as the embodiment shown in the figures, remote monitoring system 122 is a computer having a display 124, an input device 126, and a processing unit 128. In some embodiments, remote monitoring system 122 may be a computer system. In some embodiments, remote monitoring system 122 may be a laptop computer, while in other embodiments, remote monitoring system 122 may be a tablet, smartphone, PDA, computer terminal, or desktop computer system.

Display 124 may be any type of display known in the art, such as an LCD display, a plasma display, and/or a CRT. In some embodiments, display 124 is integrated into remote monitoring system 122. In other embodiments, such as the embodiment shown in FIG. 2, display 124 is a stand-alone display that is connected to the other portions of remote monitoring system 122 using data transfer cables.

Input device 126 may be any type of input device known in the art, such as a mechanical keyboard, a membrane keyboard, or a soft keyboard. In some embodiments, input device 126 may be a computer mouse. In some embodiments, input device 126 may be a drive, such as a USB drive, optical drive, or disk drive. In some embodiments, input device 126 may be a microphone or other voice activated system. In some embodiments, input device 126 may be any other type of input device capable of allowing a user to interact with remote monitoring system 122. Input device 126 may be used to provide remote monitoring system 122 with information, such as calibration information and predetermined threshold/preselected condition information.

Processing unit 128 may be any type of processing machine known in the art. In some embodiments, processing unit 128 may be a processor and associated to memory and a power supply using an electrical connection. In some embodiments, processing unit 128 may be the CPU of a computer system. In some embodiments, processing unit 128 may be part of a laptop, desktop, or terminal.

In some embodiments, remote monitoring system 122 may be manned by a monitor, a technician who can determine when remote monitoring system 122 indicates that maintenance of the bearing is due.

Figure 6:
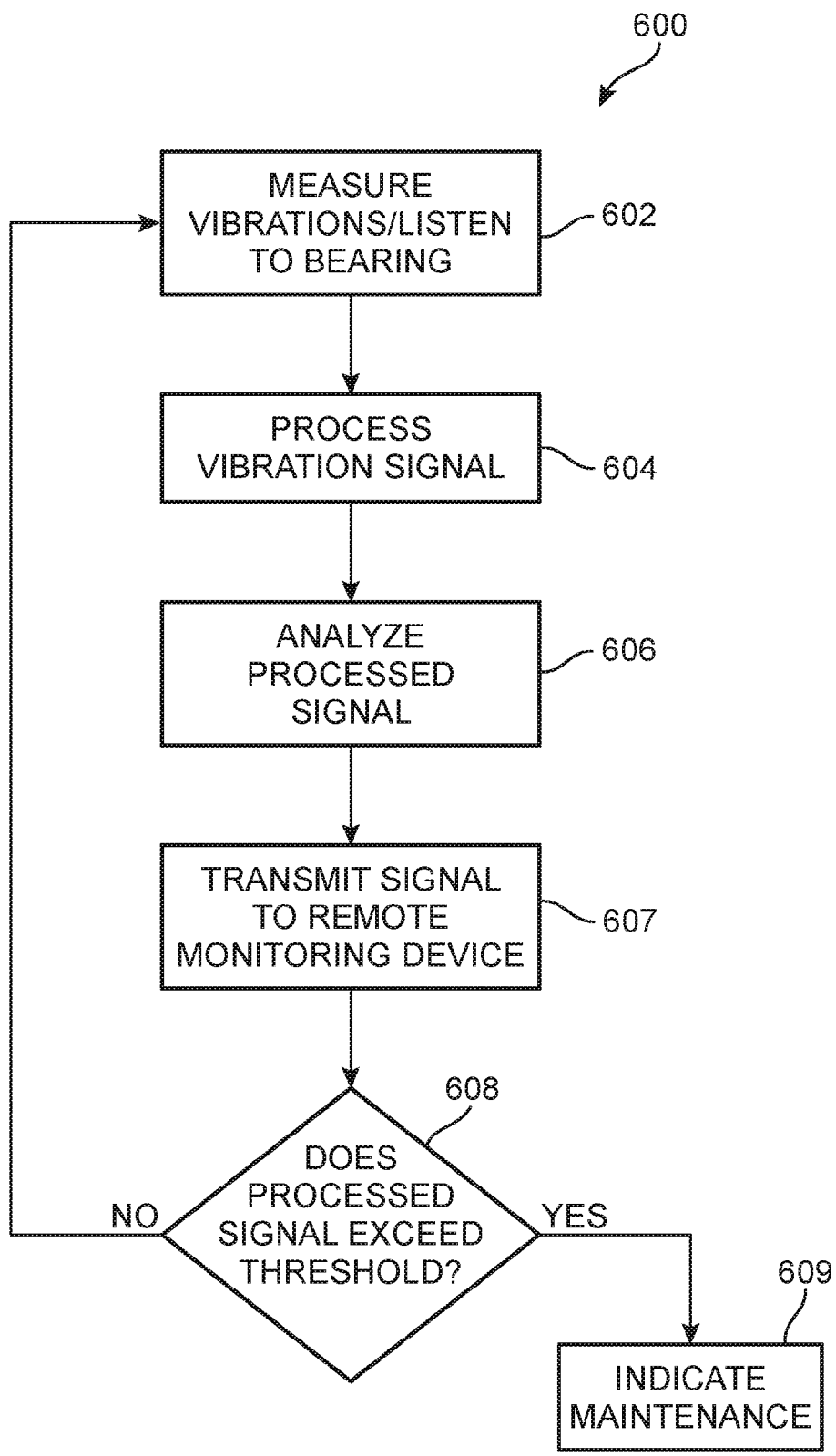
FIG. 6 is a flowchart of a method for detecting bearing failure.
Figure 7:
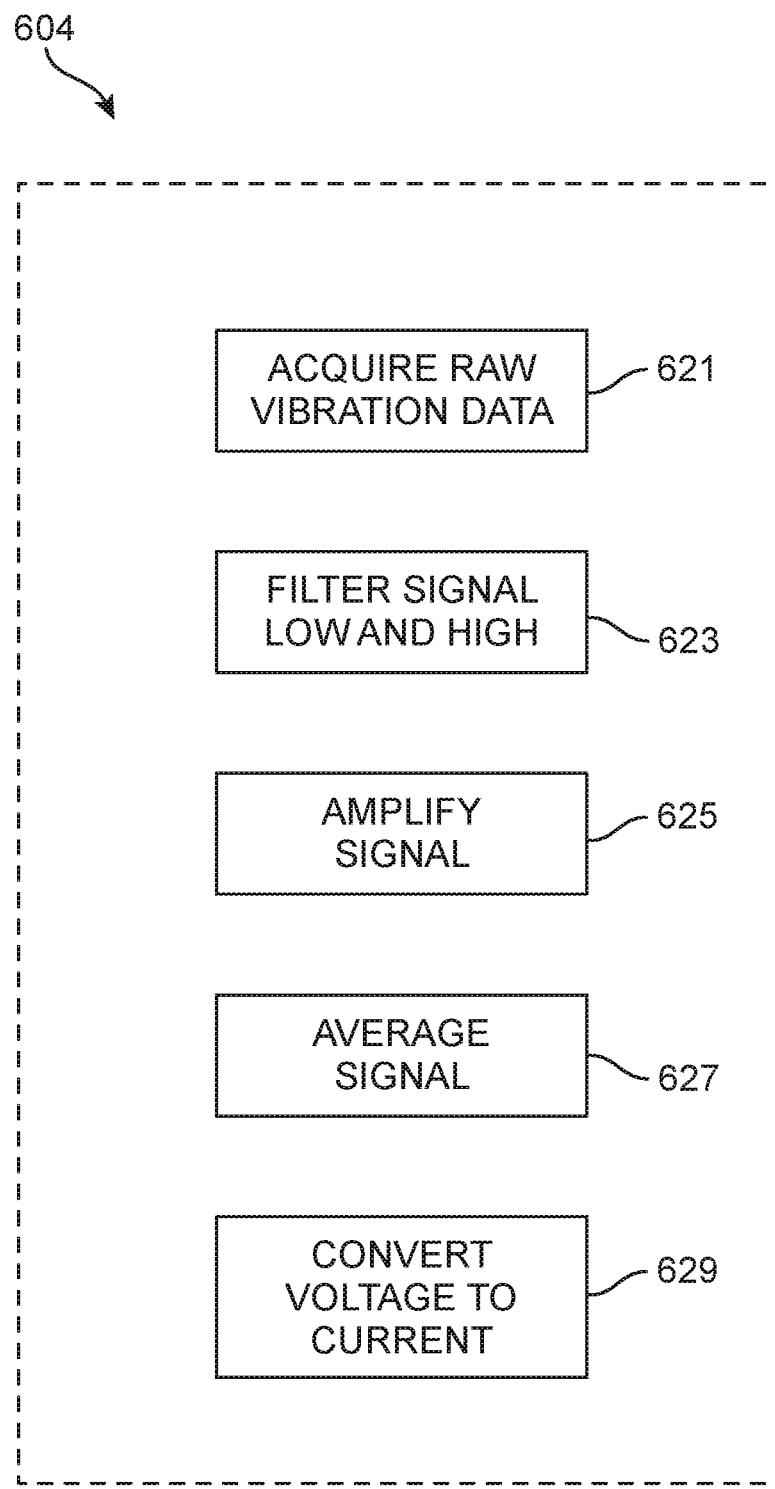
FIG. 7 is a flowchart of a process in a method for detecting bearing failure.

FIGS. 6 and 7 are flowcharts of embodiments of an implementation of a method of anticipating bearing failure using the components of the system discussed above. Method 600 is an embodiment of a method of anticipating bearing failure. Method 600 includes a first step 602, which includes measuring the vibrations of the bearing. In some embodiments, measuring the vibrations includes listening to the sounds generated by the bearing. Measuring the vibrations may be performed by accelerometer 402, discussed above. Measuring the vibrations also includes outputting a vibration signal corresponding to the measurement of the vibrations, such as an AC signal.

Method 600 includes a second step 604, which involves processing the vibration signal generated in first step 602. Processing the vibration signal involves readying the vibration signal for further analysis. Second step 604 may be performed using processing chip 404, discussed above. As such, second step 604 may include a number of additional steps, such as the processing steps shown in FIG. 7. FIG. 7 shows a flowchart of the processing steps for a system like processing chip 604. Though discussed below in a particular order, the order of steps need not occur in this order, as will be apparent to those of ordinary skill in the art.

A first processing step 621 includes acquiring raw vibration data. The raw vibration data may be obtained from first step 602 (shown in FIG. 6). The raw vibration data may be the output signal of an accelerometer such as accelerometer 402.

A second processing step 623 includes filtering the signal low and high to produce a filtered signal with a specified frequency band. The raw vibration data signal may include unwanted frequencies, such as from ambient noise or bearing noise not related to wear. In some embodiments, second processing step 623 includes sending the output signal from accelerometer 402 through a band pass filter such as band pass filter 415. In some embodiments, second processing step 623 includes filtering the output signal from accelerometer 402 through a low pass filter such as low pass filter 412 configured to reject frequencies greater than a predetermined frequency. In some embodiments, second processing step 623 includes filtering the output signal from accelerometer 402 through low pass filter 412 that is configured to reject frequencies greater than 500 Hz. In some embodiments, second processing step 623 includes filtering the output signal from accelerometer 402 through a high pass filter such as high pass filter 414 configured to reject frequencies lower than a predetermined frequency. In some embodiments, second processing step 623 includes filtering the output signal from accelerometer 402 through high pass filter 414 that is configured to reject frequencies lower than 5 Hz.

A third processing step 625 includes amplifying and rectifying the filtered signal. In some embodiments, third processing step 625 may include sending the output of band pass filter 415 to an amplifier such as amplifier 416, discussed above. Amplifier 416 increases the amplitude of the frequencies within the band of frequencies allowed by the band pass filter. The signal may be amplified to increase the power of the signal to prepare the selected frequencies for further processing by reducing noise in the AC signal. Third processing step 625 may include boosting the signal to a predetermined gain. In some embodiments, the gain of the signal may be amplified by a gain factor between approximately 30 to approximately 300. In some embodiments, third processing step 625 may include using amplifier 416 to output the sum of the frequencies that pass through band pass filter 415. In some embodiments, the end result of third processing step 625 may yield an output of amplifier 416 that is a summation of frequencies below 500 Hz.

In some embodiments, third processing step 625 may also include rectifying the output signal of band pass filter 415, because accelerometer 402 may produce an AC (alternating current) signal, while DC (direct current) may be more desirable for further signal processing. Amplifier 416 may convert the AC signal to a DC signal to smooth the sound profile, though clicking in the signal may remain due to the discontinuous nature of the noise. The rectification may occur using known techniques such as using a root mean square (RMS) signal or peak detection signal to average the power of the AC signal and translate that to a DC signal with corresponding average power.

A fourth processing step 627 includes averaging the signal over a period of time. In some embodiments, averaging filter 418 may be used to accomplish fourth processing step 627. In some embodiments, averaging filter 418 may be an integrator circuit. Fourth processing step 627 is used to smooth the electrical signal output after performing third processing step 625. In some embodiments, the noise generated by the bearing may include sporadic frequencies as the grinding and bumping of the rolling elements against each other to produce the sound waves would not necessarily be constant. The sporadic nature of the noise is discussed further below with respect to FIG. 9. Fourth processing step 627 results in a smoothing of the electrical signal produced by third processing step 625, such as by averaging the electrical signal over a time period of at least one second. In some embodiments, the time period of the averaging in fourth processing step 627 may be one to two seconds. In other embodiments, as will be apparent to those of ordinary skill in the art, the time period may be less than one second or greater than two seconds. Fourth processing step 627 produces a representative DC value of the noise emitted from the bearing.

The magnitude of the signal corresponds to the sound level of the frequencies generated by worn bearings. The magnitude of the signal increases as the frequencies generated by worn bearings increase or become louder. These frequencies increase as the bearings wear. The magnitude of the signal may be compared with a predetermined threshold value to determine if the bearing is sufficiently worn and due for maintenance or replacement. In some embodiments, the raw magnitude of the signal may provide false information because a momentary loud noises from the bearing, such as when a rolling element might knock into an adjacent bearing, may exceed the predetermined threshold even though the bearing is not yet worn enough to warrant maintenance or replacement. Therefore, fourth processing step 627 may include provisions to eliminate excursions in the signal. In some embodiments, fourth processing step 627 includes finding a best fit polynomial to represent the value of the signal over a period of time. In some embodiments, fourth processing step 627 includes finding a best-fit line.

Fifth processing step 629 takes the output signal from fourth processing step 627 and converts the signal from a voltage-carried electrical signal to a current-carried electrical signal. In some embodiments, V to I converter 420 is used to execute fifth processing step 629. In some embodiments, fifth processing step 629 results in the conversion of a voltage-carried electrical signal to a 1-to-20 mA current-carried electrical signal. In some embodiments, fifth processing step 629 results in the conversion of a voltage-carried electrical signal to a 1-to-10 mA current-carried electrical signal. In some embodiments, fifth processing step 629 results in the conversion of a voltage-carried electrical signal to a 4-to-20 mA current-carried electrical signal.

Once the signal has been processed according to second step 604, method 600 moves to analyzing the processed signal in third step 606. In some embodiments, third step 606 may be executed by local portion 120. In other embodiments, third step 606 may be executed by remote system 122. The analysis of the signal includes comparing the value of the signal to a predetermined threshold or preselected condition using any known comparison algorithm. The predetermined threshold or preselected condition may be stored in memory associated with remote monitoring system 122. In some embodiments, the comparison involves comparing the best-fit line value to the predetermined threshold or preselected condition. In some embodiments, the comparison involves comparing the slope of the best-fit line to the predetermined threshold. In some embodiments, the predetermined threshold may include a period of time over which the slope of the best-fit line is consistently positive. As will be apparent to those of skill in the art, a positive or upward slope of the best-fit line indicates that the worn bearing sounds are increasing, i.e., that the bearings are becoming more worn.

In a fourth step 607, the signal is transmitted from local portion 120 to remote system 122. In some embodiments, the transmitted signal includes the raw data output from accelerometer 402. In some embodiments, the transmitted signal includes the signal output from averaging filter 418. In some embodiments, the transmitted signal includes the signal output from V-to-I converter 420. In some embodiments, the transmitted signal includes combinations of the raw data output from accelerometer 402, the signal output from averaging filter 418, and the signal output from V-to-I converter 420. In some embodiments, the signal is averaged and the best-fit polynomial is determined prior to the signal being transmitted. In other embodiments, the signal is averaged and the best-fit polynomial is determined after the signal is transmitted.

The signal may be transmitted using any method known in the art and using any known transmission protocol. As discussed above, the signal may be prepared for transmission by a modem such as modem 410. Further, the signal may be transmitted wirelessly via an antenna line antenna 408. In other embodiments, the signal may be transmitted via a wireline. In some embodiments, the signal is transmitted to remote system 122 using a network, such as a telecommunications network or the Internet.

In a fifth step 608, the method provides a decision point. If the value of the measured signal is less than the predetermined threshold or does not match a preselected condition, then the method returns back to first step 602 and continues to measure the vibrations from the bearing. If the value of the measured signal is equal to or greater than the predetermined threshold, then the method moves to a sixth step 609.

In sixth step 609, maintenance is indicated. The maintenance indication occurs at remote monitoring system 122. The indication can be any sort of sign or device capable of providing information to the monitor that the predetermined threshold had been reached. In some embodiments, a display such as display 124 may provide a visual indication, such as a flashing screen or portion of a screen, an alarm icon may be added to the screen, and/or the color of the screen may change. In some embodiments, a sound may be triggered, such as an alarm connected to speakers associated with remote monitoring system 122. In some embodiments, an email, text message, or instant message may be sent to a stored distribution list.

FIGS. 8-12 show an embodiment of the implementation of the method shown in FIGS. 6 and 7 using the components of the system shown in FIGS. 1-5 to illustrate the systems and methods discussed above. While specific frequencies, data, and other details are presented below, in other embodiments, the specific details may be different to accommodate different types of low RPM systems and different types of bearings, as will be apparent to those of skill in the art.

Figure 8:
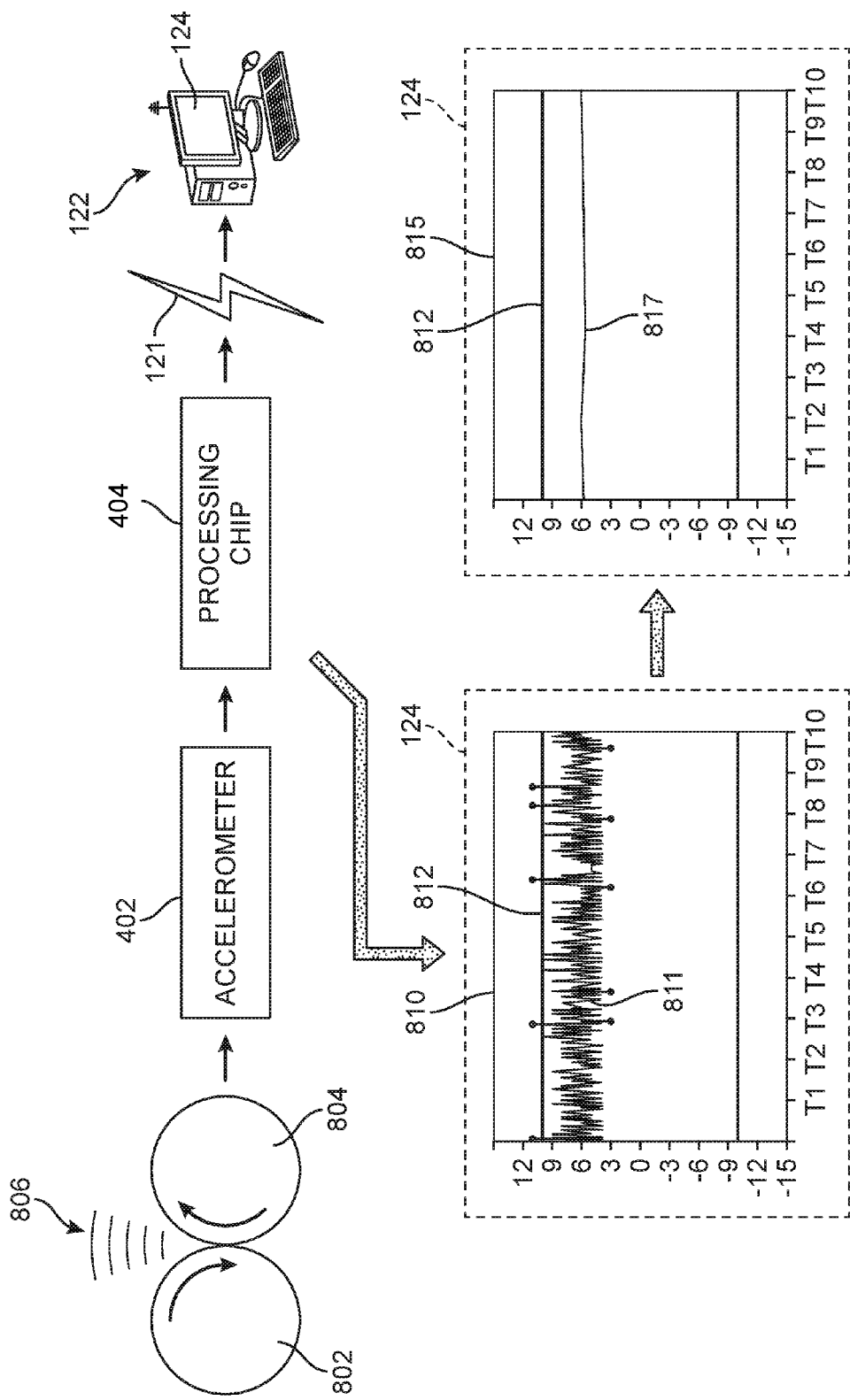
FIG. 8 is a schematic view of the use of a system for detecting bearing failure when the bearings are in good condition.
Figure 9:
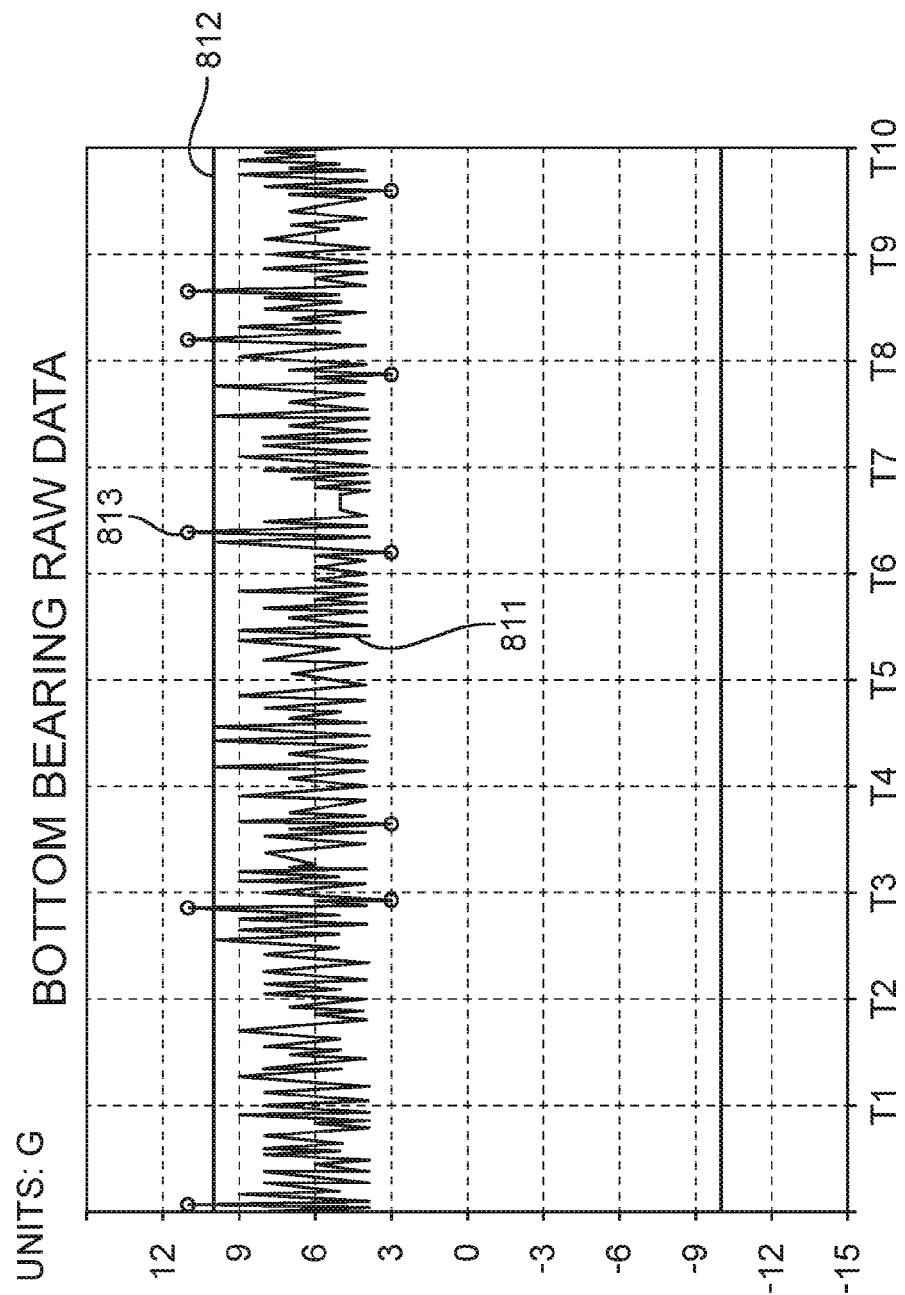
FIG. 9 shows raw noise data from a low-speed bearing.
Figure 10:
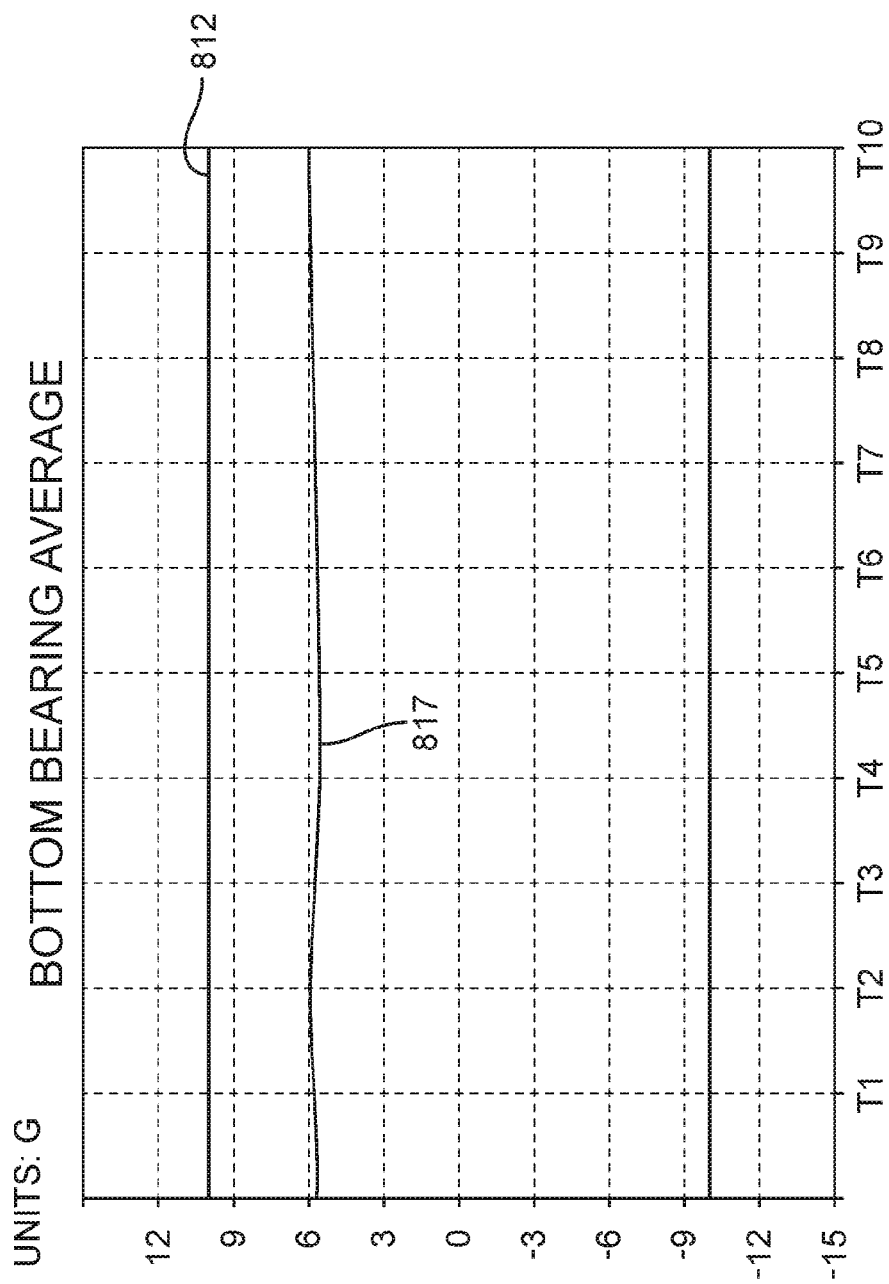
FIG. 10 shows averaged noise data from a low-speed bearing.

FIGS. 8-10 show an embodiment of a remote monitoring system in use with a low RPM spiral conveyor system while the bottom bearing of the spiral conveyor system is still good. A first rolling element 802 is adjacent to a second rolling element 804. Because the system is a low RPM system, in some cases a system turning at less than 10 RPM. Both first rolling element 802 and second rolling element 804 are unworn, though, due to manufacturing tolerances, some imperfections in the surfaces of first rolling element 802 and second rolling element 804. Therefore, when first rolling element 802 and second rolling element 804 rub against each other as a motor (not shown) turns a shaft (shown in FIG. 1), the minor imperfections on first rolling element 802 and second rolling element 804 generate noise vibrations 806. The magnitude of the frequencies of the bearing imperfections, between 5 and 500 Hz, is relatively low because the bearing is still good.

An accelerometer such as accelerometer 402 as part of an attached portion such as local portion 120 described above may be configured to detect frequencies between 0.5 Hz and 15,000 Hz measures noise vibrations 806 and generates an electrical signal carrying the noise vibration information. That noise vibration information is sent to a processing chip such as processing chip 404 as described above. The signal carrying the noise vibration information is processed according to method 604 described above to convert the signal from an AC signal carrying all noise frequencies between 0.5 Hz and 15,000 Hz to a DC signal carrying only those frequencies between 5 Hz and 500 Hz. Processing chip 404 includes a band pass filter like band pass filter 415 to remove the frequencies outside of the selected range of frequencies expected from worn bearings. In this embodiment, those expected frequencies are between 5 Hz and 500 Hz. Processing chip 404 also includes an amplifier/rectifier like amplifier 416 discussed above. The amplifier has a gain to boost the signal strength between 30 and 300 times to improve the signal to noise ratio. The amplifier also includes a rectifier to convert the signal from AC to DC. Processing chip 404 also includes an averaging filter like averaging filter 418 discussed above. The averaging filter smooths the output of the amplifier by averaging it over a time period of at least one second. The averaging filter may also find a best-fit polynomial or best-fit line to simplify the data for analysis. Processing chip 404 also includes a voltage to current converter like V to I converter 420 discussed above.

Figure 12:
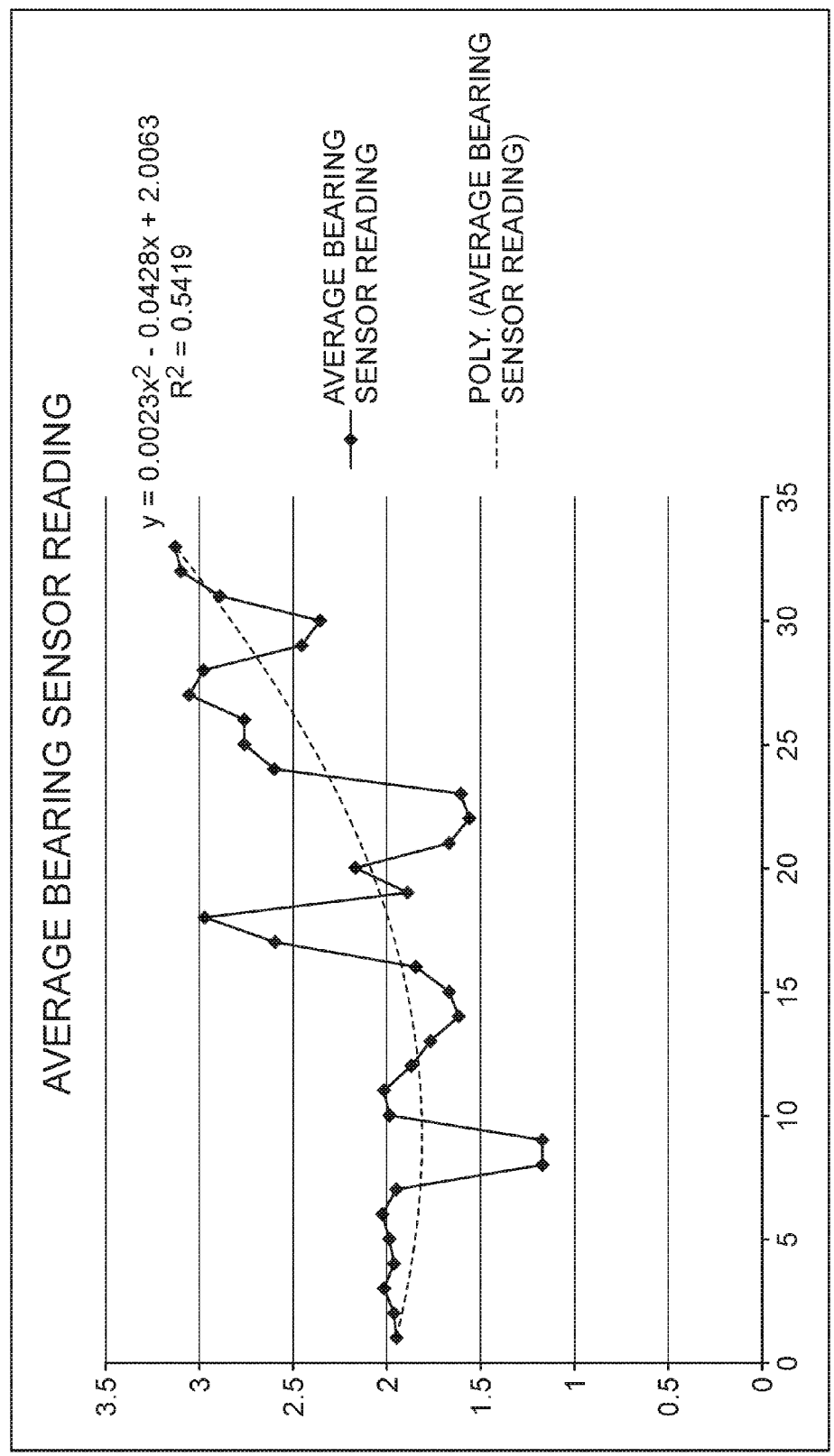
FIG. 12 is data from a low-speed bearing failure detection system showing line averaging.

One embodiment of a fitting of the signal raw data to a polynomial is shown in FIG. 12 (not the data shown in FIGS. 8-10). Regression analysis, such as the method of least squares, may be applied to the data. Such analyses are well known to those of ordinary skill in the art. For the averaged data shown in FIG. 12, for example, the fluctuations in the data are removed and fitted to the following polynomial with a correlation coefficient of $R^2=0.5419$: $y=0.0023x^2-0.0428x+2.0063$ The method of least squares is only one technique appropriate to find a line to fit the acquired data. As will be known to those in the art, other types of line fitting techniques may be employed to find a polynomial or line to fit the data.

The output of processing chip 404 is transmitted to a remote monitoring system like remote monitoring system 122 via a network like network 121 described above. Once at remote monitoring system 122, remote monitoring system 122 compares the signal to the predetermined threshold/preselected condition to determine if the bearing is sufficiently worn to receive maintenance and/or replacement. Remote monitoring system 122 may contain memory to store the received data. Remote monitoring system 122 may receive a continuous feed of information from local portion 120, or remote monitoring system 122 may receive periodic bursts of information from local portion 120, such as once a day. Regardless of how often the information is transmitted, remote monitoring system 122 can produce a graphical image by altering the pixels on a display like display 124 of the received information over time, as shown in FIG. 8.

Display 124 can display a raw data image 810. Raw data 811, which is shown in greater detail in FIG. 9, is produced by local portion 120 and received by remote monitoring system over a period of time, from T1 to T10, which may be minutes, hours, days, months, or any other interval selected by a user of the system. In this embodiment, T1 to T10 is a period of several days. The peaks and troughs of raw data 811 reflect the intermittent noise generation from first rolling element 802 and second rolling element 804.

Some peaks, such as peak 813, exceed an alarm threshold 812, which is the predetermined threshold/preselected condition that should cause the system to indicate maintenance of the low RPM bearing. However, the general trend of the data is well below alarm threshold 812. To avoid false positives and subsequent unnecessary shut downs for maintenance and/or costs associated with replacing parts before the life of the part has ended, a best-fit polynomial such as a line to fit raw data 811 is determined. That best-fit line 817 is displayed on display 124 as shown in FIG. 8.

The best-fit line 817 is shown in greater detail in FIG. 10. When the jittering, fluctuating aspect of raw data 811 due to the intermittent nature of the noise generated by the bearing has been removed, the data trend is more clearly seen. Best-fit line 817 is still well below alarm threshold 812, so no indication of maintenance is warranted.

In some embodiments, instead of a predetermined threshold such as alarm threshold 812, the system is programmed to indicate maintenance when a preselected condition in the data arises. In some embodiments, this preselected condition may be the slope of the best-fit line such as best-fit line 817. If the slope of best-fit line 817 exceeds a threshold steepness, the bearing may be wearing at a rate sufficient to warrant inspection and/or maintenance. If the slope of best-fit line 817 is consistently positive over a period of time, the bearing may be wearing at a rate sufficient to warrant inspection and/or maintenance. As shown in FIG. 10, neither of these conditions have been met, as the slope of best-fit line 817 is not steep and the slope is not positive for an extended period of time.

Figure 11:
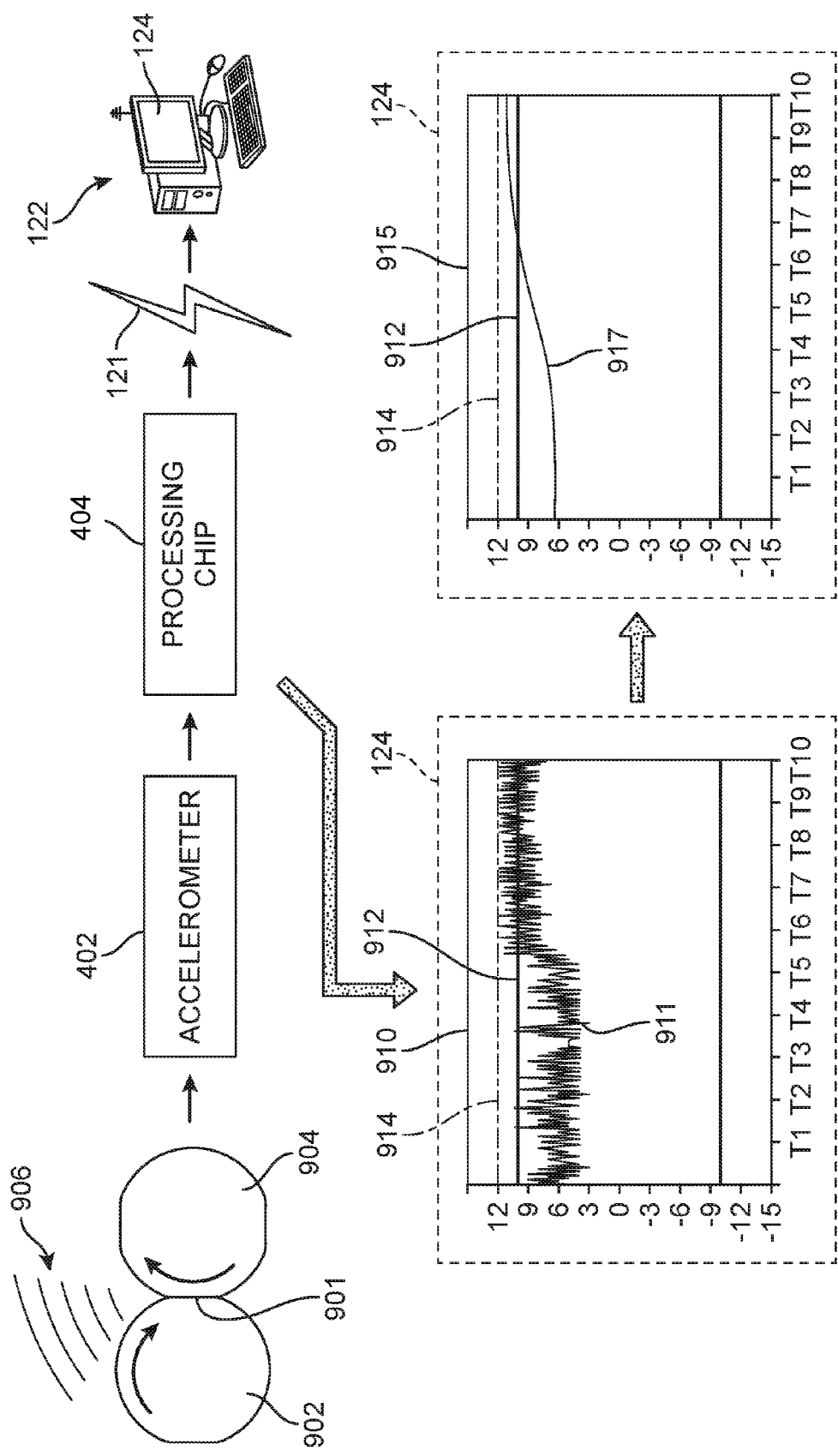
FIG. 11 is a schematic view of the use of a system for detecting bearing failure when the bearings are in a worn condition.

Over time, the bearings of the system wear. FIG. 11 shows a first worn bearing 902 and second worn bearing 904. First worn bearing 902 and second worn bearing 904 each have significantly worn portions such as worn portion 901. When first worn bearing 902 and second worn bearing 904 generate higher magnitude noise vibrations 906, which is louder than noise vibrations 806 because the worn portions 901 generate more noise than smooth surfaces. As described above with respect to FIG. 8, an accelerometer like accelerometer 402 detects higher magnitude noise vibrations 906 and generates an electrical signal carrying the vibration information. That electrical signal carrying the vibration information is processed according to method 604 described above by a processing chip like processing chip 404 to produce an averaged DC signal carrying only those vibration frequencies between 5 Hz and 500 Hz. The signal may be best-fit to a polynomial.

The output of processing chip 404 is again transmitted to a remote monitoring system like remote monitoring system 122 via a network like network 121 described above. Once at remote monitoring system 122, remote monitoring system 122 compares the signal to the predetermined threshold/preselected condition to determine if the bearing is sufficiently worn to receive maintenance and/or replacement. Local portion 120 and/or remote monitoring system 122 may contain memory to store the received data. Remote monitoring system 122 may receive a continuous feed of information from local portion 120, or remote monitoring system 122 may receive periodic bursts of information from local portion 120, such as once a day. Regardless of how often the information is transmitted, remote monitoring system 122 can produce a graphical image by altering the pixels on a display like display 124 of the received information over time, as shown in FIG. 11.

Display 124 can display a louder raw data image 910. Louder raw data 911 is produced by local portion 120 and received by remote monitoring system over a period of time, from T1 to T10, which may be minutes, hours, days, months, or any other interval selected by a user of the system. In this embodiment, T1 to T10 is a period of several days. The peaks and troughs of louder raw data 911 reflect the intermittent noise generation from first worn bearing 902 and second worn bearing 904.

Unlike raw data 811, a number of peaks of louder raw data 911 exceed an alarm threshold 912, which is the predetermined threshold/preselected condition that should cause the system to indicate maintenance of the low RPM bearing. The general trend of the data, as reflected by second best-fit line 917, consistently exceeds alarm threshold 912 after time T7. As such, the system will trigger a notification, such as a visual indication, a sound, an email, text, or IM message to a distribution list, or any other type of notification capable of being automatically generated by a computer or other type of processing unit.

A benefit of having remote monitoring of the bearing is that the two-part monitoring system allows for easy retrofitting of existing systems. Installing an attached portion sensor package like local portion 120 to an exterior surface of a bearing housing is a simple and low labor cost operation. Further, because local portion 120 is configured to detect noise and not housing vibrations, local portion 120 may be successful in measuring noise vibrations from a number of different types and configurations of bearing. Therefore, the monitoring system is not bearing or conveyor system dependent, so the monitoring system may be successfully used with a large number of different systems.

Another benefit of the remote monitoring system is that a monitor may be provided with expertise in installing, calibrating, and using the system. Because of differences in bearings, speeds, and environmental conditions, the frequencies generated by a particular bearing as the bearings wear may vary from an expected generic set of worn bearing frequencies. When an attached portion like local portion 120 is installed on a low RPM system, the monitor may review the incoming data for a period of time to determine the wearing frequencies of the bearing. The monitor may then use that information to calibrate the system, such as by determining which frequencies to filter and what type of threshold or condition to set. Additionally, the monitor may have expertise in the types of bearings and low RPM systems that the remote monitoring systems could be monitoring. This expertise can assist in selecting the frequencies to filter and the type of threshold or condition to set to trigger the notification. Because training a monitor may be expensive, outsourcing the monitor duties to a specialist may be cost-effective for the company using the low RPM system.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

The invention claimed is:

1. A conveyor system for advance detection of bearing failure for a bearing rotating at a low RPM, the bearing being incorporated in a conveyor mechanism, and the bearing having an outer portion, an inner portion, and an intermediate portion separating the outer portion from the inner portion, the conveyor system comprising:
   an accelerometer portion positioned proximate the bearing, wherein the accelerometer is configured to measure a vibration of the bearing and to output an alternating-current electrical signal indicative of the measured vibrations;
   a low-pass filter portion configured to pass frequency components of the alternating-current electrical signal that are less than a low-passing frequency and configured to reject frequency components of the alternating-current electrical signal that are above the low-passing frequency;
   an AC-to-DC conversion portion configured to convert the alternating-current electrical signal indicative of the measured vibrations to a direct-current electrical signal containing information regarding a condition of the bearing;
   a transmitter in electrical communication with the AC-DC conversion portion and configured to transmit the information regarding the condition of the bearing;
   a remote monitoring device, wherein the remote monitoring device is configured to receive from the transmitter the information regarding the condition of the bearing; and
   a warning device associated with the remote monitoring device, wherein the warning device is configured to indicate when the information received by the remote monitoring device exceeds a predetermined threshold indicating that the condition of the bearing is deteriorating,
   an averaging filter portion in electrical communication with the AC-to-DC conversion portion and configured to smooth the alternating-current electrical signal from the AC-to-DC conversion portion by averaging a first alternating-current electrical signal measured at a first point in time with a second alternating-current electrical signal measured at a second point in time that is later than the first point in time.

2. The conveyor system according to claim 1, wherein the intermediate portion of the bearing includes at least one rolling element.

3. The conveyor system according to claim 1, wherein the conveyor mechanism is a spiral conveyor mechanism.

4. The conveyor system according to claim 1, wherein the conveyor mechanism is for food processing.

5. The conveyor system according to claim 1, wherein the accelerometer portion is secured to the outer portion of the bearing.

6. The conveyor system according to claim 1, wherein the outer portion is a housing.

7. The conveyor system according to claim 1, wherein the accelerometer portion is configured to detect a sound emitted by a bearing rotating between approximately 0.1 RPM and approximately 10.0 RPM.

8. The conveyor system according to claim 1, wherein the accelerometer portion is configured to detect frequencies between approximately 0.5 Hz and approximately 15,000 Hz.

9. The conveyor system according to claim 1, wherein the low-passing frequency is approximately 500 Hz.

10. The conveyor system according to claim 1, wherein the conveyor system further comprises a high-pass filter portion configured to reject frequency components of the alternating-current electrical signal that are less than a high-passing frequency and configured to pass frequency components of the alternating-current electrical signal that are greater than the high-passing frequency.

11. The conveyor system according to claim 10, wherein the high-passing frequency is approximately 5 Hz.

12. The conveyor system according to claim 10, wherein both the low-pass filter portion and the high-pass filter portion are incorporated in a band-pass filter.

13. The conveyor system according to claim 1, wherein the direct-current electrical signal is selected from a group consisting of (a) an RMS signal derived from the alternating-current electrical signal and (b) a peak-detection signal derived from the alternating-current electrical signal.

14. The conveyor system according to claim 1, further comprising an amplifier portion configured to amplify the alternating-current electrical signal by a predetermined gain.

15. The conveyor system according to claim 14, wherein the predetermined gain is between approximately 30 and approximately 300.

16. The conveyor system according to claim 14, wherein the conveyor system includes one or more elements that implement at least part of both the AC-to-DC conversion portion and the amplifier portion.

17. The conveyor system according to claim 1, wherein the second point in time is at least one second after the first point in time.

18. The conveyor system according to claim 17, wherein the conveyor system further comprises a voltage-to-current conversion portion in electrical communication with the averaging filter and configured to convert a voltage-carried electrical signal to current-carried electrical signal.

19. The conveyor system according to claim 18, wherein the voltage-to-current conversion portion is configured to convert the voltage-carried electrical signal to a 1-to-10 mA current-carried electrical signal.

20. The conveyor system according to claim 18, wherein the voltage-to-current conversion portion is configured to convert the voltage-carried electrical signal to a 1-to-20 mA current-carried electrical signal.

21. The conveyor system according to claim 1, wherein the remote monitoring device comprises a polynomial fitting portion configured to acquire a plurality of values for a parameter of the alternating-current electrical signal over a period of time and configured to determine a polynomial that best fits the plurality of values in the period of time.

22. The conveyor system according to claim 1, wherein the remote monitoring device comprises a linear fitting portion configured to acquire a plurality of values for a parameter of the alternating-current electrical signal over a period of time and configured to determine a line that best fits the plurality of values in the period of time.

23. The conveyor system according to claim 22, wherein the alerting device is configured to indicate when a slope of the line reaches a predetermined threshold slope.

24. The conveyor system according to claim 1, wherein the remote monitoring device comprises a display portion configured to display the plurality of values over the period of time.

25. A component of a conveyor system for advance detection of bearing failure for a bearing rotating between approximately 0.1 RPM and approximately 10.0 RPM, the bearing being incorporated in a conveyor mechanism, and the bearing having an outer portion, an inner portion, and an intermediate portion separating the outer portion from the inner portion, the component comprising:
an accelerometer portion positioned proximate the bearing and configured to measure a vibration of the bearing and to output alternating-current electrical signal indicative of the measured vibrations, wherein the accelerometer detects frequencies between approximately 0.5 Hz and approximately 15,000 Hz;
a frequency filtering portion configured to pass frequency components of the alternating-current electrical signal that are less than approximately 500 Hz and configured to reject frequency components of the alternating-current electrical signal that is greater than approximately 500 Hz; and
an AC-to-DC conversion portion configured to rectify the alternating-current electrical signal indicative of the measured vibrations to a direct-current electrical signal containing information regarding a condition of the bearing, wherein the component is configured to process the alternating-current electrical signal output by the accelerometer through both the frequency filtering portion and the AC-to-DC conversion portion, wherein the component is configured to transmit a first electrical signal derived from the direct-current electrical signal; and
an averaging filter portion in electrical communication with the accelerometer and configured to smooth alternating-current electrical signal from the accelerometer by averaging a first alternating-current electrical signal measured at a first point in time with a second alternating-current electrical signal measured at a second point in time that is later than the first point in time.

26. The component according to claim 25, wherein the output of the accelerometer is coupled with an input of the frequency filtering portion, and an output of the frequency filtering portion is coupled with an input of the AC-to-DC conversion portion.

27. The component according to claim 25, wherein the frequency filtering portion is configured to reject frequency components of the electrical signal less than approximately 5 Hz, to pass frequency components of the electrical signal between approximately 5 Hz and approximately 500 Hz, and to reject frequency components of the electrical signal greater than approximately 500 Hz.

28. The component according to claim 25, wherein the direct-current electrical signal is selected from a group consisting of (a) an RMS signal derived from the alternating-current electrical signal and (b) a peak-detected signal derived from the alternating-current electrical signal.

29. The component according to claim 25, wherein the component further comprises an amplifier portion configured to amplify electrical signals by a gain between approximately 30 and approximately 300, and wherein the component is configured to additionally process the output of the accelerometer through the amplifier portion.

30. The component according to claim 29, wherein the component includes one or more elements that implement at least part of both the AC-to-DC conversion portion and the amplifier portion.

31. The component according to claim 25, wherein the component further comprises an amplifier portion, and an input of the averaging filter portion is coupled with an output selected from a group consisting of (1) an output of the AC-to-DC conversion portion, and (2) an output of the amplifier portion.

32. The component according to claim 25, wherein the component further comprises a voltage-to-current conversion portion configured to convert a voltage-carried electrical signal to a 4-20 mA current-carried electrical signal, and wherein the component is configured to additionally process the output of the accelerometer through the voltage-to-current conversion portion.

33. The component according to claim 31, wherein the component further comprises an averaging filter portion, and an output of the averaging filter portion is coupled with an input of the voltage-to-current conversion portion.

34. The component according to claim 24, wherein the component includes an alarm indicator input, and wherein the component further includes an alarm portion configured to set an alarm based upon the alarm indicator input.

35. A method for advance detection of bearing failure for a bearing rotating between approximately 0.1 RPM and approximately 10.0 RPM, the bearing being incorporated in a conveyor mechanism, and the bearing having an outer portion, an inner portion, and an intermediate portion separating the outer portion from the inner portion, the method comprising steps of:
positioning an accelerometer adjacent to the bearing to measure a vibration of the bearing and to output alternating-current electrical signal indicative of the measured vibrations, the accelerometer being configured to detect frequencies between approximately 0.5 Hz and approximately 15,000 Hz;
filtering the output of the accelerometer through a low-pass filter configured to reject frequencies greater than 500 Hz;
rectifying the output of the accelerometer through an AC-to-DC converter configured to convert the alternating-current electrical signal indicative of the measured vibrations to direct-current electrical signal-containing information regarding a condition of the bearing;
transmitting a first electrical signal derived from the direct-current electrical signal to a remote monitoring device; and
using an averaging filter portion in electrical communication with the accelerometer to smooth the alternating-current electrical signal from the accelerometer by averaging a first alternating-current electrical signal measured at a first point in time with a second alternating-current electrical signal measured at a second point in time that is later than the first point in time.

36. The method according to claim 35, further comprising a step of filtering the output of the accelerometer through a high-pass filter configured to reject frequencies lower than 5 Hz.

37. The method according to claim 35, further comprising a step of amplifying the output of the accelerometer by a gain factor between approximately 30 and approximately 300.

38. The method according to claim 35, further comprising a step of converting the output of the accelerometer to a 4-to-20 mA current-carried electrical signal.

39. The method according to claim 35, further comprising steps of:
   acquiring a plurality of values for a parameter of the output of the accelerometer over a period of time; and
   determining a line that best fits the plurality of values in the period of time.

40. The method according to claim 39, further comprising a step of activating an alarm when a condition arises, the condition being selected from a group consisting of (a) the line reaching a predetermined threshold value, and (b) the line reaching a predetermined threshold slope.

41. The method according to claim 35, wherein the accelerometer is secured to the outer portion of the bearing.

42. The method according to claim 35, wherein the intermediate portion of the bearing includes at least one ball.

\* \* \* \* \*